No. 752,766. PATENTED FEB. 23, 1904.
G. J. EXTERKAMP.
DUMPING WAGON.
APPLICATION FILED DEC. 2, 1903.
NO MODEL.
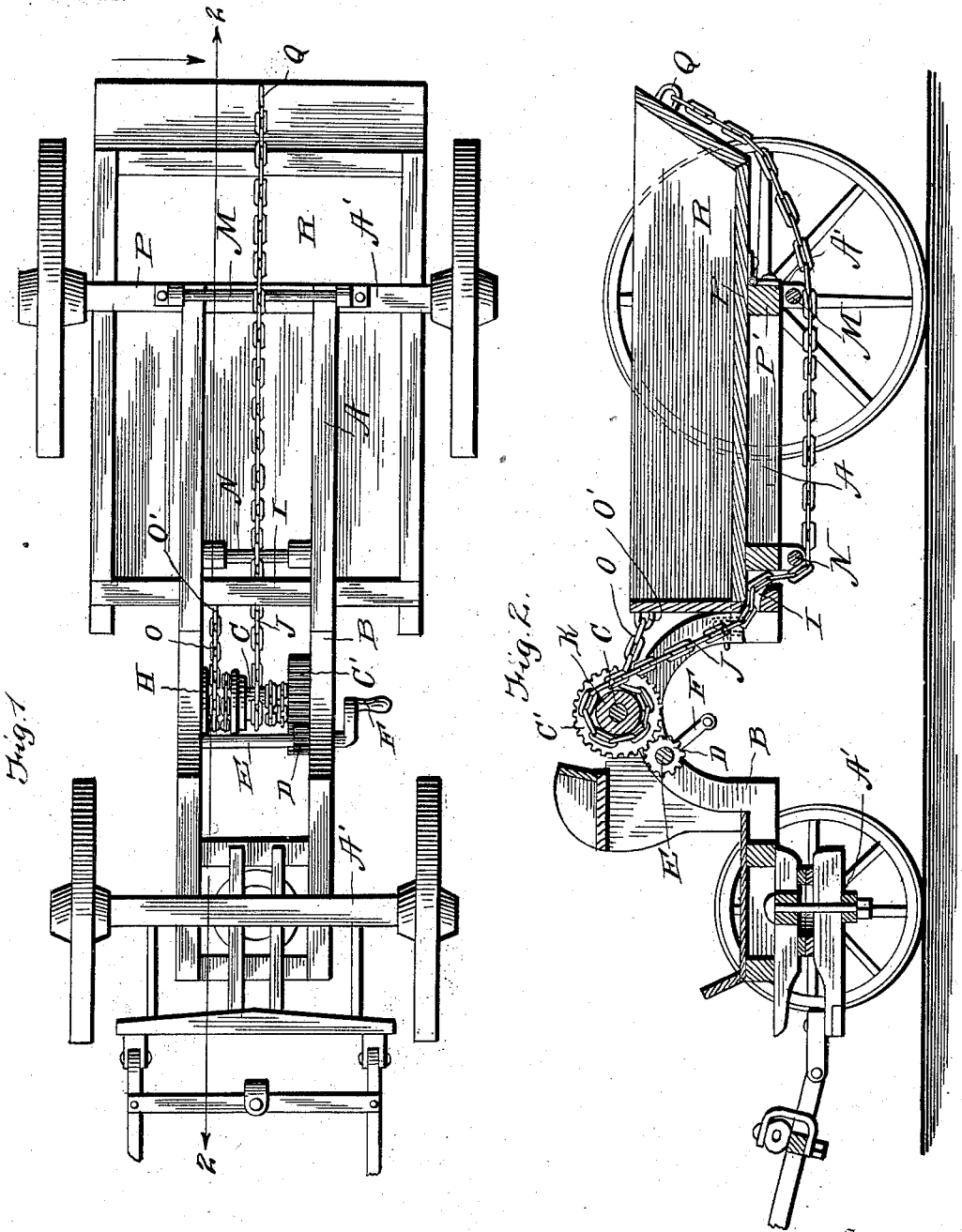

No. 752,766. Patented February 23, 1904.

UNITED STATES PATENT OFFICE.

GEORGE J. EXTERKAMP, OF COVINGTON, KENTUCKY.

DUMPING-WAGON.

SPECIFICATION forming part of Letters Patent No. 752,766, dated February 23, 1904.

Application filed December 2, 1903. Serial No. 183,485. (No model.)

*To all whom it may concern:*

Be it known that I, GEORGE J. EXTERKAMP, a citizen of the United States, residing at Covington, in the county of Kenton and State of Kentucky, have invented certain new and useful Improvements in Dumping-Wagons; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in dumping-wagons, and comprises an apparatus in which a dumping-box is provided which is pivotally mounted in the frame of a truck and having chains secured to the opposite ends thereof adapted to wind upon drums of different diameters upon the same shaft, whereby as the winding-drum is rotated in one direction or the other the dumping-wagon may be raised or lowered.

The invention consists in various details of construction and combinations of parts, which will be hereinafter fully described, and then specifically defined in the appended claim.

I illustrate my invention in the accompanying drawings, in which—

Figure 1 is a bottom plan view of my invention. Fig. 2 is a vertical sectional view on line 2 2 of Fig. 1.

Reference now being had to the details of the drawings by letter, A designates a truck of the wagon having axles A' and wheels thereon. Mounted upon arched beams B, forming a portion of the frame, is a shaft C, having a pinion-wheel C' fixed to rotate therewith which is in mesh with a pinion D, mounted upon and rotating with the shaft E, also journaled in said arched beams. A crank-handle F is fixed to the shaft E, whereby the latter may be rotated. Said shaft C has winding-drums of different diameters, one of which (designated by letter H) is provided with flanges and is of larger diameter than the winding-drum K. A chain J is secured at one end to the circumference and is adapted to wind about the drum K, while its other end passes through an aperture in the cross-beam I and under antifriction-rollers N and M, mounted on the frame of the truck, and its rear end is fastened to an eye Q at the rear end of the dumping-box R. The chain O is fastened at one end and adapted to wind about the drum H of larger diameter than the drum K, and said chain O is fastened to an eye O' at the forward end of the box of the dumping-wagon. Said box is pivotally mounted at P to the cross-beam P' of the truck, (shown clearly in Fig. 2 of the drawings,) and the length of the two chains is such and they are so arranged upon their respective winding-drums that when the operator turns the crank in one direction the chain J will draw up one end of the dumping-wagon and will cause the rear end of the box to tilt down and the forward end of the box to tilt up. By reverse movement of the shaft E the chain J will unwind from the winding-drum, and the chain O will draw upon the eye at the forward end of the box and draw the latter down to its normal horizontal position. Projecting from the forward end of the box is an apertured lug, which is adapted to receive a key for the purpose of locking the box in a horizontal position.

From the foregoing it will be observed that by the provision of the apparatus disclosed a dumping-wagon is produced which may be easily and quickly operated by the simple manipulation of the shaft in one direction or the other, causing the box to be elevated or lowered, as may be desired.

While I have shown a particular construction of apparatus embodying the features of my invention, it will be understood that I may make alterations, if desired, in the detailed construction of the same without in any way departing from the spirit of the invention.

Having thus described my invention, what I claim as new, and desire to secure by Letters Patent, is—

A dumping-wagon comprising in combination with a truck having arched beams, a tilting box mounted upon the truck, a shaft C mounted upon said arched portion, drums of different diameters upon said shaft, chains winding upon said drums, one of said chains being fastened to the rear of the tilting box, and the other to the forward end, cross-pieces of the truck adjacent to the rear arched portions of the frame, one of said cross-pieces being apertured to receive one of said chains, and antifriction-rollers underneath the frame against which the chain which passes through said aperture contacts, as set forth.

In testimony whereof I hereunto affix my signature in presence of two witnesses.

GEORGE J. EXTERKAMP.

Witnesses:
 LILLIAN REYNOLDS,
 OLLIE HELLMANN.